July 16, 1968     J. R. VAN WAZER ET AL     3,393,218
POLYMERIC SILAZANE COMPOUNDS
Filed May 18, 1964
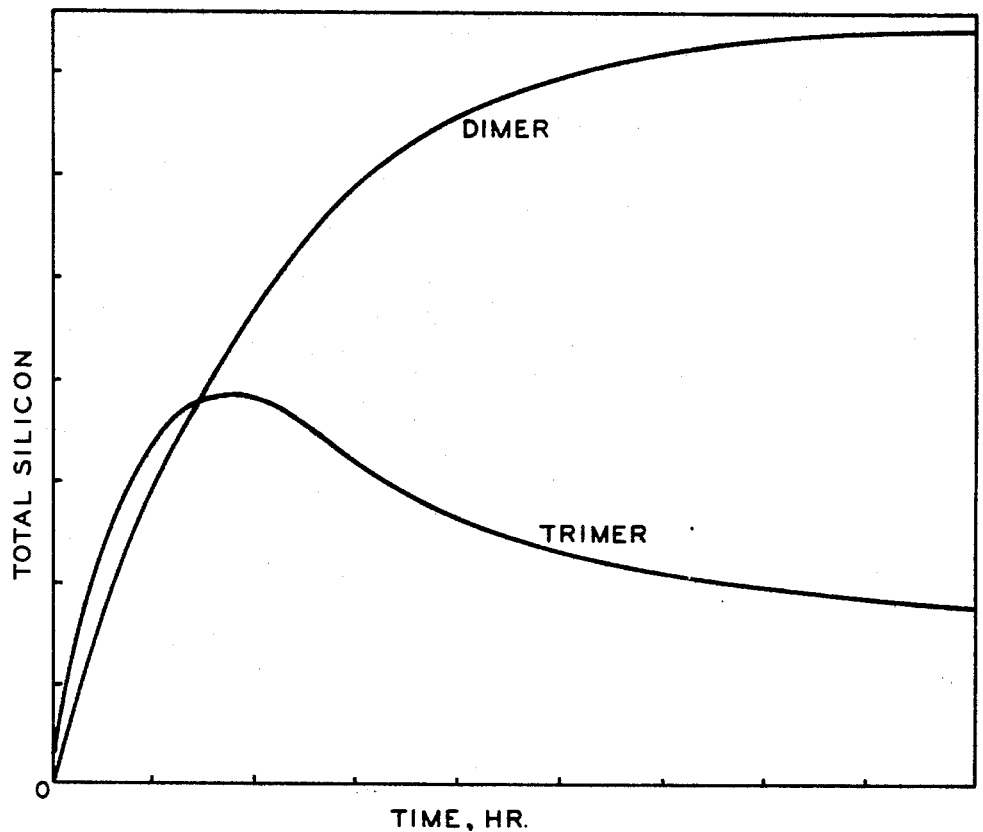
INVENTORS
JOHN R. VAN WAZER
KURT MOEDRITZER
BY *Herman P. Bauermeister*
ATTORNEY

United States Patent Office 3,393,218
Patented July 16, 1968

3,393,218
POLYMERIC SILAZANE COMPOUNDS
John R. Van Wazer, Ladue, and Kurt Moedritzer, Webster Groves, Mo., assignors to Monsanto Company, St. Louis, Mo., a corporation of Delaware
Filed May 18, 1964, Ser. No. 368,213
12 Claims. (Cl. 260—448.2)

ABSTRACT OF THE DISCLOSURE

The invention relates to silazane compounds having the general formula:

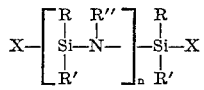

in which R and R' are alike or different, and are selected from the group consisting of hydrocarbyl radicals, having from 1 to 20 carbon atoms, such as saturated and unsaturated alkyl radicals having from 1 to 20 carbon atoms, and phenyl and substituted phenyl radicals having from 6 to 20 carbon atoms; and R'' is selected from the group consisting of hydrocarbyl radicals, having from 1 to 20 carbon atoms, such as saturated and unsaturated alkyl radicals having from 1 to 20 carbon atoms, and phenyl and substituted phenyl radicals having from 6 to 20 carbon atoms; X is a halogen such as fluorine, chlorine, bromine and iodine as well as alkoxyl, thioalkyl, dialkylamino and cyano, and $n$ has a value of 1 to 100. The silazane compounds have utility as monomeric starting materials for use in the production of silicon-containing polymers. Other applications are as water-proofing agents.

---

The present invention relates to novel polymeric silicon and nitrogen containing compounds of the silazane type which are unsubstituted at the nitrogen atom, or are N-substituted, and particularly to linear chain molecular configurations thereof.

According to the invention, there are provided new and valuable silazane compounds having the general formula:

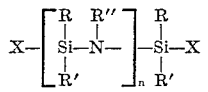

in which R and R' are alike or different, and are selected from the group consisting of hydrocarbyl radicals, having from 1 to 20 carbon atoms, such as saturated and unsaturated alkyl radicals having from 1 to 20 carbon atoms, and phenyl and substituted phenyl radicals having from 6 to 20 carbon atoms; and R'' is selected from the group consisting of hydrogen and hydrocarbyl radicals, having from 1 to 20 carbon atoms, such as saturated and unsaturated alkyl radicals having from 1 to 20 carbon atoms, and phenyl and substituted phenyl radicals having from 6 to 20 carbon atoms; X is a halogen such as fluorine, chlorine, bromine and iodine as well as alkoxyl, thioalkyl, dialkylamino and cyano, and $n$ has a value of 1 to 100. For example, when $n=1$, the chlorine-substituted product is a linear dimer for example

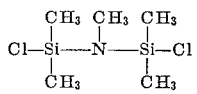

having a molecular weight of 218, or when $n=2$, the product is a trimer

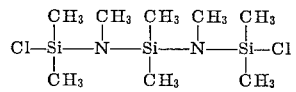

having a molecular weight of 341.5.

Silazane compounds have been heretofore limited to ring types of molecular configurations, for example (A)      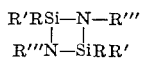

(B)      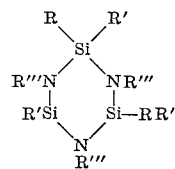

and (C)      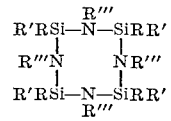

where R and R' have the meaning set forth above and R''' is H or alkyl. However, the ring compounds have not yielded polymeric materials.

The general method of preparation of the novel chain type polymeric silazanes utilizes a di-substituted dihydrocarbyl silane and a trimeric cyclodihydrocarbyl silazane. The silane material such as a di-substituted dialkyl silane is employed in the proportion of 3:1 to 3:50 relative to the trimeric cyclodihydrocarbyl silazane, with the larger proportions favoring the production of higher polymeric products. These two components are heated to a temperature of from 30° C. to 250° C. The chain type polymeric silazanes which result exist as dimeric, trimeric, tetrameric, pentameric, hexameric, heptameric, octameric, nonameric, decameric and higher forms. As an example of an N-unsubstituted silazane starting material, hexaethyltrisilazane is reacted at 40° C. with dichlorodiethyl silane to obtain linear polymers of alpha, omega-dichloropolydiethyl silazane. As another specific example of a desirable material, alpha, omega-dichloropolydiphenyl-N-methyl silazane is obtained by heating and mixing together dichloro diphenyl silane with trimeric cyclo diphenyl-N-methyl silazane at a temperature of about 100° C.

The linear polymeric products are separated from the reaction mixture. However, the products are generally obtained as mixtures of polymers which may be used in the form of mixtures for certain industrial applications.

The silazane starting material such as trimeric cyclodiphenyl-N-methyl silazane is prepared by reacting hexaphenyl trisilazane with methyl lithium and a methyl halide.

The reaction is preferably conducted in a closed vessel, although the use of relatively high boiling starting materials, e.g., a boiling point of at least 100° C. for the silane starting material, permits the use of an open vessel.

While the silane and silazane components described above react without a catalyst, it has been found that Lewis acid type catalysts provide a faster reaction to obtain the present products. For example, aluminum chloride, boron trifluoride, zinc dichloride, ferric tribromide and antimony pentachloride are representative catalysts which are useful in the present process.

The aforesaid reactants are preferably sealed into a reaction vessel using an inert atmosphere such as nitrogen gas. The reaction tubes are then maintained at a temperature in the range of from 30° C. to 250° C. for a period of time of from 1 hour to 200 hours, with the higher temperatures providing a shorter reaction time. If desired a solvent such as benzene, ether, or hydrocarbons may be employed, although a solvent is not essential. The polymeric products of the present invention have good stability, although some of the halogen containing polymers have been found to undergo a slow depolymerization.

The following examples illustrate specific embodiments of the present invention.

Example 1

The preparation of the methyl substituted polymeric silazane is shown in the present example. A pressure tube is charged with 1 mole of dimethyl dichlorosilane together with ⅓ of a mole of hexamethyl tri-N-methylcyclotrisilazane. The tube containing this mixture is sealed under nitrogen, and is then heated in a tube furnace. The progress of the reaction is followed by withdrawing the tube from the furnace from time to time and measuring the presence of the desired polymeric reaction products by nuclear magnetic resonance.

The tables below show various details of the process.

TABLE I

Time needed for preparation of dimeric and trimeric alpha-omega-dichloro dimethyl-N-methyl silazanes (reported as time for attaining maximum yield

| Temperature, ° C.: | Time, hr. |
|---|---|
| 120 | 70 |
| 150 | 9 |
| 170 | 2 |
| 200 | 0.25 |

In the drawing of the present patent application the curves show the generalized kinetic relationship for the production of the dimer and trimer of the above silazanes. Specifically, the alpha-omega dichloro-polydimethyl-N-methyl silazanes are represented in Table I above, to show the time required for the production of maximum yield, while Table II shows the distribution of products.

TABLE II

Variation of degree of polymerization in the alpha-omega-dichloro-polydimethyl-N-methyl silazane system with time at 120° C.

| Time (hrs.) | Dimer, (wt. percent) | Trimer, (wt. percent) |
|---|---|---|
| 5 | 18 | 24 |
| 10 | 20 | 35 |
| 20 | 48 | 37 |
| 80 | 73 | 20 |

The remainder of the products include minor proportions of various side products, as well as higher polymeric forms.

In order to separate the desired chain compounds up to the decameric form and higher from the reaction mixture, various separation procedures such as chromatographis absorption and distillation are employed. Distillation is preferably carried out under vacuum conditions.

For example, the dimeric compound of Tables I and II

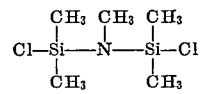

has a boiling point of approximately 50° C. at 2 mm. pressure

The trimeric compound of Tables I and II

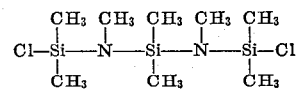

shown above has an approximate boiling point of 140° C. at 2 mm. pressure. Separation of the dimer and trimer is readily carried out by distillation.

Identifications of the molecular characterization of the chain compositions of the present invention are conducted by the following procedure. The dimer is identified by the proton nuclear magnetic resonance spectrum with peaks at —2.60 p.p.m. and —0.51 p.p.m. in the ratio of 1:4, which is in agreement with the ratio of methyl groups bonded to silicon and nitrogen. The trimer gives proton nuclear magnetic resonances at —2.52 and —0.48 p.p.m. in the calculated ratio of 6:2 for methyl groups on silicon versus methyl groups on nitrogen.

Example 2

The use of a butoxy group as a substituent in the products and process of the present invention is shown by following the procedure of Example 1, using dibutoxy diethylsilane having the formula $$(C_4H'O)_2Si(C_2H_5)_2$$

This reagent is used with hexaethyl tri-N-methylcyclotrisilazane as the silicon-nitrogen component in the ratio of 10 moles of hexaethyl tri-N-methylcyclotrisilazane, and 1 mole of dibutoxy diethylsilane. The products show a greater proportion of the higher polymeric forms such as the tetramer in comparison to Example 1 above, e.g., the maximum amount of tetramer obtained as a white solid is between 20% and 40% based upon the silicon in such tetramer relative to the total silicon present. The reaction products also include higher polymeric forms such as the pentamer, hexamer, octamer, etc.

The various polymeric forms are soluble in benzene, hydrocarbon and chlorocarbon solvents such as carbon tetrachloride.

Example 3

The use of phenyl groups as a substituent in the products and process of the present invention is shown by following the procedure of Example 1, using dichloro diphenyl silane having the formula $$(C_6H_5)_2SiCl_2$$

This reagent is used with hexaphenyl tri-N-methylcyclotrisilazane as the silicon-nitrogen ring in the ratio of 5 moles of hexaphenyl-tri-N-methylcyclotrisilazane, and 1 mole of dichloro diphenyl silane. The reaction products also include higher polymeric forms such as the pentamer, hexamer, octamer, etc.

The various polymeric forms are soluble in benzene, hydrocarbon and chlorocarbon solvents such as carbon tetrachloride.

Example 4

The use of an unsaturated group as a substituent in the products and process of the present invention is shown by following the procedure of Example 1, using dimethylmercapto divinyl silane having the formula $$(CH_3S)_2Si(CH=CH_2)_2$$

This reagent is used with hexavinyl tri-N-phenylcyclotrisilazane as the silicon-nitrogen chain in the ratio of 10 moles of hexavinyl tri-N-phenylcyclotrisilazane, and 1 mole of dimethylmercapto divinylsilane in the presence of 1% aluminum chloride as catalyst. The reaction products also include higher polymeric forms such as the pentamer, hexamer, octamer, etc.

The various polymeric forms are soluble in benzene, hydrocarbon and chlorocarbon solvents such as carbon tetrachloride, and are separated by column chromatography. In the present example the major products are the dimer, trimer and tetramer of alpha, omega-dimercapto-polydivinyl-N-phenyl silazane.

Example 5

The use of an N-unsubstituted silazane and a methoxy group as a substituent in the products and process of the present invention is shown by following the procedure of Example 1, using dimethoxy dimethyl silane having the formula $$(CH_3O)_2Si(CH_3)_2$$

This reagent is used with hexamethyl tri-N-methylcyclotrisilazane as the silicon-nitrogen component in the ratio of 10 moles of hexamethyltri-N-methylcyclotrisilazane, and 1 mole of dimethoxydimethylsilane. The products show a greater proportion of the higher polymeric forms such as the tetramer in comparison to Example 1 above, e.g., the maximum amount of tetramer obtained as a white solid is between 20% and 40% based upon the silicon in such tetramer relative to the total weight of silicon present. The reaction products also include higher polymeric forms such as the pentamer, hexamer, octamer, etc.

The various polymeric forms are soluble in benzene, hydrocarbon and chlorocarbon solvents such as carbon tetrachloride.

The polymeric silazanes of the present invention particularly the unsaturated alkyl types have utility as monomeric starting materials for use in the production of silicon containing polymers, and are particularly desirable for use in copolymerization with unsaturated hydrocarbon monomers such as vinyl chloride, vinyl acetate, styrene, acrylonitrile, butadiene, etc. Silicone monomers may also be copolymerized with the present silazanes. Other silicon containing compounds such as $RSiX_3$, for example $CH_3SiCl_3$, $C_6H_5Si(OCH_3)_3$, $C_2H_5Si[N(CH_3)_2]_3$ and $CH_2CH_2Si(SC_2H_5)_3$, may also be used in copolymers of the present linear polymeric silazanes to give higher molecular weight copolymers. Other applications for these compounds are as water proofing agents, particularly the methyl substituted polymeric silazanes. The present polymeric silazanes are also reactive with cellulose. Consequently, modified forms of cellulose, such as rayon, e.g., a water resistant film based upon regenerated cellulose is obtainable by treatment with the present materials.

What is claimed is:

1. Linear polymeric chain silazanes having the general formula

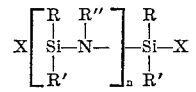

in which R and R' are alike or different radicals selected from the group consisting of hydrocarbyl radicals having from 1 to 20 carbon atoms, R" is selected from the group consisting of hydrocarbyl radicals having from 1 to 20 carbon atoms; X is selected from the group consisting of fluorine, chlorine, bromine, iodine, alkoxyl, thioalkyl, dialkylamino and cyano; and n has a value of 1 to 100.

2. The linear polymeric composition

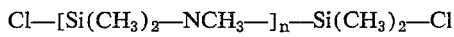

where n is a whole number from 1 to 100.

3. The linear polymeric composition $$Cl—[Si(C_6H_5)_2—NCH_3—]_n—Si(C_6H_5)_2—Cl$$

where n is a whole number from 1 to 100.

4. The linear polymeric composition $$C_4H_9O—[Si(C_2H_5)_2—NCH_3]_n—Si(C_2H_5)_2—OC_4H_9$$

where n is a whole number from 1 to 100.

5. The linear polymeric composition $$CH_3S—[Si(CH=CH_2)_2—NC_6H_5]_n$$
$$—Si(CH=CH_2)_2—SCH_3$$

where n is a whole number from 1 to 100.

6. The linear polymeric composition $$CH_3O—[Si(CH_3)_2—NH]_n—Si(CH_3)_2—OCH_3$$

where n is a whole number from 1 to 100.

7. The process for preparing a linear polymeric silazane having the formula

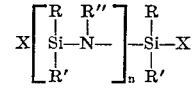

in which R and R' are alike or different, and are selected from the group consisting of hydrocarbyl radicals having from 1 to 20 carbon atoms; R" is selected from the group consisting of hydrocarbyl radicals having from 1 to 20 carbon atoms; X is selected from the group consisting of fluorine, chlorine, bromine, iodine, alkoxyl, thioalkyl, dialkylamino and cyano; and n has a value of 1 to 100, which comprises mixing and heating, at a temperature of from 30° C. to 250° C., $(RR'SiX_2)$ together with a cyclic silazane trimer $(RR'SiNR'')_3$ in the molar proportion of 3:1 to 3:50.

8. The process for preparing a linear polymeric silazane having the formula $$Cl[Si(CH_3)_2—NHC_3]_n—Si(CH_3)_2—Cl$$

where n is 1 to 100, which comprises mixing and heating together, at a temperature of from 30° C. to 250° C., $(CH_3)_2SiCl_2$ together with the cyclic silazane trimer $[CH_3)_2SiNCH]_3$, in the molar proportion of 3:1 to 3:50, and thereafter separating the linear chain products from the reaction mixture.

9. The process for preparing a linear polymeric silazane having the formula $$Cl—[Si(C_6H_5)_2—NCH_3]_n—Si(C_6H_5)_2—Cl$$

where n is 1 to 100, which comprises mixing and heating together, at a temperature of from 30° C. to 250° C., $(C_6H_5)_2SiCl_2$ together with the cyclic trimer $[(C_6H_5)_2SiNCH_3]_3$, in the molar proportion of 3:1 to 3:50, and thereafter separating the linear chain products from the reaction mixture.

10. The process for preparing a linear polymeric silazane having the formula $$C_4H_9O—[Si(C_2H_5)_2—NCH_3]_n—Si(C_2H_5)_2—OC_4H_9$$

where n is 1 to 100, which comprises mixing and heating together, at a temperature of from 30° C. to 250° C., $(C_2H_5)_2Si(OC_4H_9)_2$ together with the cyclic trimer $[(C_2H_5)_2SiNCH_3]_3$, in the molar proportion of 3:1 to 3:50, and thereafter separating the linear chain products from the reaction mixture.

11. The process for preparing a linear polymeric silazane having the formula $$CH_3S—[Si(CH=CH_2)_2—NC_6H_5]_n$$
$$—Si(CH=CH_2)_2—SCH_3$$

where n is 1 to 100, which comprises mixing and heating together, at a temperature of from 30° C. to 250° C., $(CH=CH_2)_2Si(SCH_3)_2$ together with the cyclic silazane trimer $[(CH=CH_2)_2SiNC_6H_5]_3$, in the molar proportion of 3:1 to 3:50, and thereafter separating the linear chain products from the reaction mixture.

12. The process for preparing a linear polymeric silazane having the formula $$CH_3O-[Si(CH_3)_2-NH]_n-Si(CH_3)_2-OCH_3$$

where $n$ is 1 to 100, which comprises mixing and heating together, at a temperature of from 30° C. to 250° C., $(CH_3)_2Si(OCH_3)_2$ together with the cyclic trimer $$[(CH_3)_2SiNH]_3$$

in the molar proportion of 3:1 to 3:50, and thereafter separating the linear chain products from the reaction mixture.

References Cited

UNITED STATES PATENTS

| | | | |
|---|---|---|---|
| 2,462,635 | 2/1949 | Haber | 260—448.2 |
| 2,570,719 | 10/1951 | Rudel et al. | 252—49.6 |

OTHER REFERENCES

Eaborn, "Organosilicon Compounds," Academic Press (1960), page 228.

TOBIAS E. LEVOW, *Primary Examiner.*

J. PODGORSKI, *Assistant Examiner.*

UNITED STATES PATENT OFFICE
CERTIFICATE OF CORRECTION

Patent No. 3,393,218                                  July 16, 1968

John R. Van Wazer et al.

It is certified that error appears in the above identified patent and that said Letters Patent are hereby corrected as shown below:

Column 3, line 74, "chromatographis" should read -- chromatographic". Column 4, line 33, "$(C_4H'O)_2Si(C_2H_5)_2$" should read -- $(C_4H_9O)_2Si(C_2H_5)_2$ --. Column 6, line 32, "$(RR'SiX_2$" should read -- $RR'SiX_2$ --; line 37, "$Cl[Si(CH_3)_2-NHC_3]n-Si(CH_3)_2-Cl$" should read -- $Cl[Si(CH_3)_2-NCH_3]n-Si(CH_3)_2-Cl$ --; line 42, "$[CH_3)_2SiNCH]_3$" should read -- $[(CH_3)_2SiNCH_3]_3$ --; line 70, "where" should read -- when --.

Signed and sealed this 13th day of January 1970.

(SEAL)
Attest:

Edward M. Fletcher, Jr.                              WILLIAM E. SCHUYLER, JR.
Attesting Officer                                              Commissioner of Patents